United States Patent
Yu

(10) Patent No.: US 7,522,550 B2
(45) Date of Patent: Apr. 21, 2009

(54) AUTOMATIC CONTROL APPARATUS AND METHOD FOR TD-SCDMA MOBILE TERMINAL

(75) Inventor: Jae-Wook Yu, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 891 days.

(21) Appl. No.: 10/704,980

(22) Filed: Nov. 12, 2003

(65) Prior Publication Data

US 2004/0097255 A1    May 20, 2004

(30) Foreign Application Priority Data

Nov. 19, 2002    (KR) .................. 10-2002-0072078

(51) Int. Cl.
*H04B 7/204* (2006.01)
(52) U.S. Cl. .................. 370/320; 370/278; 370/336; 370/345
(58) Field of Classification Search .......... 455/557, 455/522, 14, 462, 99, 137; 370/423, 276, 370/328, 329, 282, 318, 535, 543, 345, 278, 370/320, 336; 375/22
See application file for complete search history.

(56) References Cited

U.S. PATENT DOCUMENTS

| | | | |
|---|---|---|---|
| 4,608,559 A | | 8/1986 | Friedman et al. .......... 340/825.5 |
| 5,121,391 A | * | 6/1992 | Paneth et al. .................. 370/341 |
| 6,243,413 B1 | * | 6/2001 | Beukema .................... 375/222 |
| 6,285,744 B1 | * | 9/2001 | Nero et al. ............... 379/27.01 |
| 6,788,662 B2 | * | 9/2004 | Ozluturk et al. ............. 370/335 |
| 7,366,142 B2 | * | 4/2008 | Ngai et al. .................. 370/335 |
| 2001/0012775 A1 | * | 8/2001 | Modzelesky et al. ........ 455/427 |
| 2003/0078011 A1 | * | 4/2003 | Cheng et al. .................. 455/73 |
| 2003/0118081 A1 | * | 6/2003 | Philips et al. ............... 375/130 |
| 2003/0181182 A1 | * | 9/2003 | Hoi ............................ 455/258 |

(Continued)

FOREIGN PATENT DOCUMENTS

EP    1 161 109    12/2001

(Continued)

OTHER PUBLICATIONS

Japanese Office Action (Jun. 24, 2005).

(Continued)

*Primary Examiner*—Ricky Ngo
*Assistant Examiner*—Dewanda Samuel
(74) *Attorney, Agent, or Firm*—KED & Associates, LLP

(57) ABSTRACT

The automatic control system of a mobile terminal for time division duplex (TDD) based communication system includes an RF processing module which controls quality of a transmission channel, and a baseband modem connected to the RF processing module through a transmission data line and a reception data line. The baseband modem generates automatic control signals based on control information received from a base station and transmitting the automatic control signal to the RF processing module through the transmission data line in a reception mode of the mobile terminal. The automatic control signals are transmitted to the RF processing module through the transmission data line, which is in the idle state, in the reception mode. Additional control lines are not required to transmit the respective automatic control signals. Therefore, utilization of the transmit data line between the baseband modem and the RF processing module can be improved.

13 Claims, 4 Drawing Sheets

U.S. PATENT DOCUMENTS

2004/0097255 A1* 5/2004 Yu .............................. 455/522
2007/0026805 A1* 2/2007 Ishida ....................... 455/63.1

FOREIGN PATENT DOCUMENTS

| | | |
|---|---|---|
| EP | 1 335 619 | 8/2003 |
| JP | 06-303181 | 10/1994 |
| JP | 08-139632 | 5/1996 |
| WO | WO 03/041025 | 5/2003 |

OTHER PUBLICATIONS

European Search Report dated Jun. 25, 2008.

* cited by examiner

US 7,522,550 B2

AUTOMATIC CONTROL APPARATUS AND METHOD FOR TD-SCDMA MOBILE TERMINAL

BACKGROUND OF THE INVENTION

1. Field of the Invention

The present invention relates to a mobile communication system, and particularly, to an apparatus and method for automatically controlling a Time Division-Synchronous Code Division Multiple Access (TD-SCDMA) terminal.

2. Background of the Related Art

Typically, in a mobile communication system, a base station performs uplink power control in order to solve a near/far problem in a cell and to maximize system capacity. The uplink power control can be divided into an uplink open loop power control and an uplink closed loop power control. A transmission power of a terminal in the uplink open loop power control is determined by an average of powers received by a base station through all Code Division Multiple Access (CDMA) channels. After performing the transmission initialization of the uplink channels through the open loop power control, the power control method is changed to the closed loop power control such that the transmission power of the terminal is determined by a power control signal received from the base station.

FIG. 1 shows a frame format adopted to a TD-SCDMA system. As shown in FIG. 1, a radio frame is subdivided into 2 subframes and each subframe is divided into a plurality of time slots. A transmit power control (TPC) symbol is transmitted to the mobile terminal once per 5 ms subframe and FIG. 1 shows a time slot TS4 having the TPC symbol, as an example. The mobile terminal controls the transmission power of itself based on the TPC received from the base station in a closed loop power control process.

Generally, the mobile terminal uses three types of automatic control signals to control a quality of transmission channel: an automatic power control (APC) signal for controlling transmission power, an automatic gain control (AGC) signal for controlling receiving power, and an automatic frequency control (AFC) signal for compensating for a small change of reference frequency. These automatic control signals are generated in a baseband modem of the mobile terminal under control of an upper layer application and transmitted to a transmission/reception (Tx/Rx) unit of an RF processing module.

FIG. 2 is a block diagram illustrating a related art automatic control apparatus for a TD-SCDMA transceiver, which comprises a baseband modem 20 and an RF processing module 10. Data received through an antenna is processed with a low noise amplifier (LNA), a mixer, an IF VGA, and an IQ decoder of the RF processing module 10, and transmitted to the baseband modem 20. In addition, the data to be transmitted is modulated by the baseband modem 20, transferred to the RF processing module 10, and transmitted through the antenna after being processed by the RF processing module 10 having an IQ coder, an IF mixer and the variable gain amplifier (VGA).

As shown in FIG. 2, the transmission data processed in a control unit 22 of the baseband modem 20 is transmitted to the Tx/Rx unit 12 of the RF processing module 10 through an ADC/DAC interface 25. The received data processed in the Tx/Rx unit 12 is transmitted to the control unit 22 of the baseband modem 20 through the ADC/DAC interface 25.

Also, the control unit 22 of the baseband modem 20 generates automatic control signals and transmits the signals to the RF processing module 10 through control lines 31, 32 and 33 which are additionally installed and used for the respective control signals. The control signals are generated in a pulse width modulation (PWM) method, and converted into DC signals by a low pass filter (LPF) 30 located between the RF processing module 10 and the baseband modem 20. Then, AGC and APC are transmitted to the Tx/Rx unit 12 and AFC is transmitted to an oscillator 17.

However, the related art automatic control apparatus has numerous disadvantages. For example, three signal lines are required for transmitting the respective control signals in addition to the data line. This makes a PCB wiring and routing design for the control signal more complex.

Also, since the automatic control signal is a PWM signal in the conventional automatic control apparatus, a filter for converting the PWM signal into the DC signal is required. Furthermore, since the filter consists of passive devices, it is difficult to integrate the filter in an IC chip, resulting in a corresponding increase of the apparatus size.

The above references are incorporated by reference herein where appropriate for appropriate teachings of additional or alternative details, features and/or technical background.

SUMMARY OF THE INVENTION

In one exemplary embodiment of the present invention, an automatic control apparatus for a TD-SCDMA terminal, capable of facilitating circuitry design of a PCB and simplifying PCB routing by removing the signal lines for transmitting automatic control signals.

In another exemplary embodiment of the present invention, an automatic control apparatus is provided for a TD-SCDMA terminal, capable of integrating all the devices consisting of a RF processing module in one chip by removing the filter for converting a PWM signal into a DC signal.

In one aspect of the present invention, the automatic control system of a mobile terminal for time division duplex (TDD) based communication system comprises an RF processing module which controls quality of a transmission channel and a baseband modem connected to the RF processing module through a transmission data line and a reception data line, the baseband modem generating automatic control signals based on control information received from a base station and transmitting the automatic control signal to the RF processing module through the transmission data line in a reception mode of the mobile terminal.

The baseband modem includes a converter which converts digital data to be transmitted into analog data and converts received analog data into digital data and a control unit which controls the converter.

The RF processing module includes a transmission/reception unit which processes data received through an antenna of the mobile terminal so as to transmit the data to the baseband modem, and which processes transmission data received from the baseband modem so as to transmit the transmission data through the antenna, an oscillator which generates oscillating frequency, and a switch which checks kinds of the automatic control signals from the baseband modem and selectively transmits the automatic control signals to the transmission/reception unit and the oscillator according to the kind of the automatic control signal.

The automatic control signals are an automatic power control (APC), automatic gain control (AGC), and automatic frequency control (AFC) signals. The switch transmits the AFC signal to the oscillator and transmits the APC and AGC signals to the transmission unit.

In another aspect of the present invention, the automatic control method for a TDD based mobile terminal determines whether the mobile terminal is in a transmission or reception mode, determines whether or not an automatic control command is received from an upper layer when the mobile terminal is in the reception mode, generates automatic control signals based on the automatic control command if the automatic control command is received from the upper layer, transmits the automatic control signals to the RF processing module, and configures quality of a transmission channel based on the automatic control signals.

The automatic control signals are transmitted through a transmission data line connecting the baseband modem and the RF processing unit. The automatic control signals are transmitted to the RF processing module before the mobile terminal enters the reception mode. The automatic control signals are an automatic power control (APC), automatic gain control (AGC), and automatic frequency control (AFC) signals.

The automatic control signals are routed to associated elements of the transmission/reception unit if the automatic control signal is the APC or AGC signal and routed to the oscillator if the automatic control signal is the AFC signal.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Generally, in a time division duplex (TDD) based mobile communication system such as TD-SCDMA, transmission and reception channels of a mobile terminal are determined by time rather than frequency. Therefore, the transmission channel is idle when the mobile terminal is in the reception mode. An automatic control apparatus according to the present invention uses this property of the time based transmission/reception channel separation. The automatic control signal generated in a baseband modem is transmitted to a transmission/reception (Tx/Rx) module through a data transmission line rather than additional control signal lines in reception mode.

Figure 1:
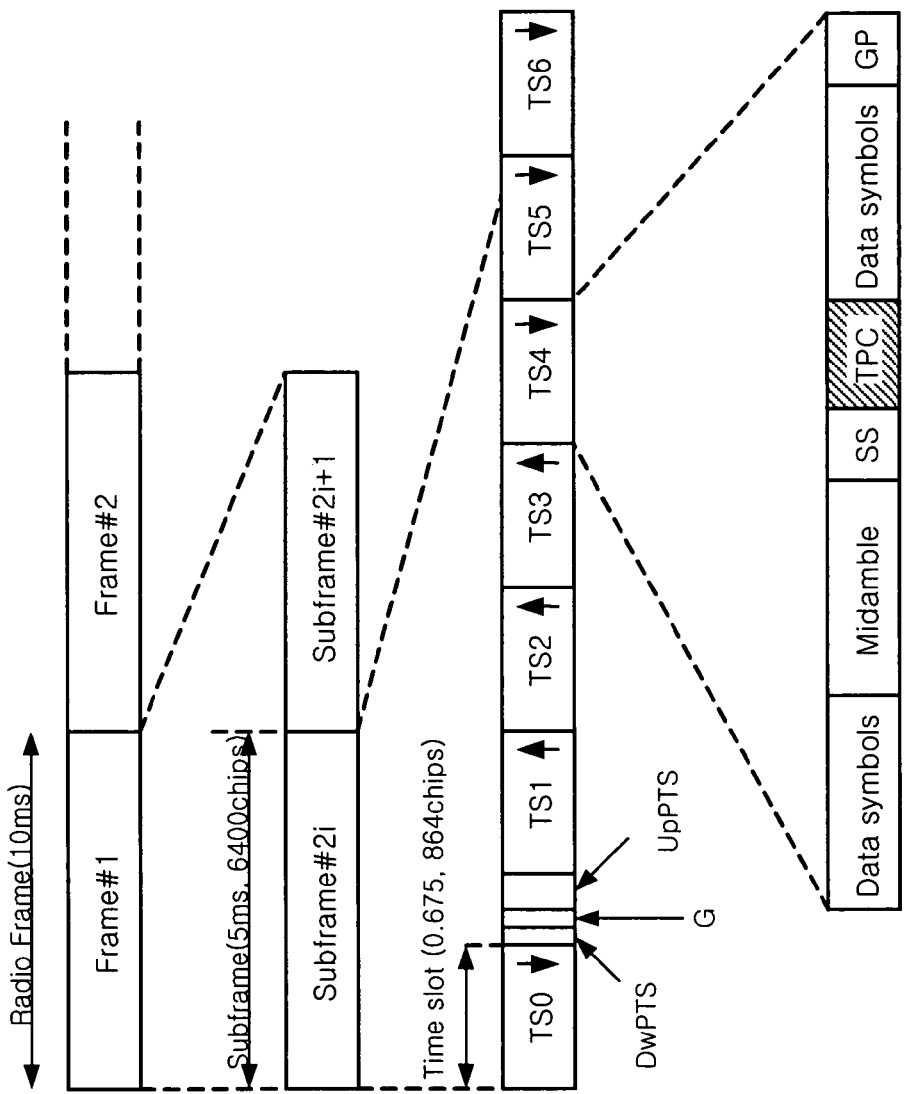
FIG. 1 is a drawing illustrating a frame format adopted for a TD-SCDMA system.
Figure 2:
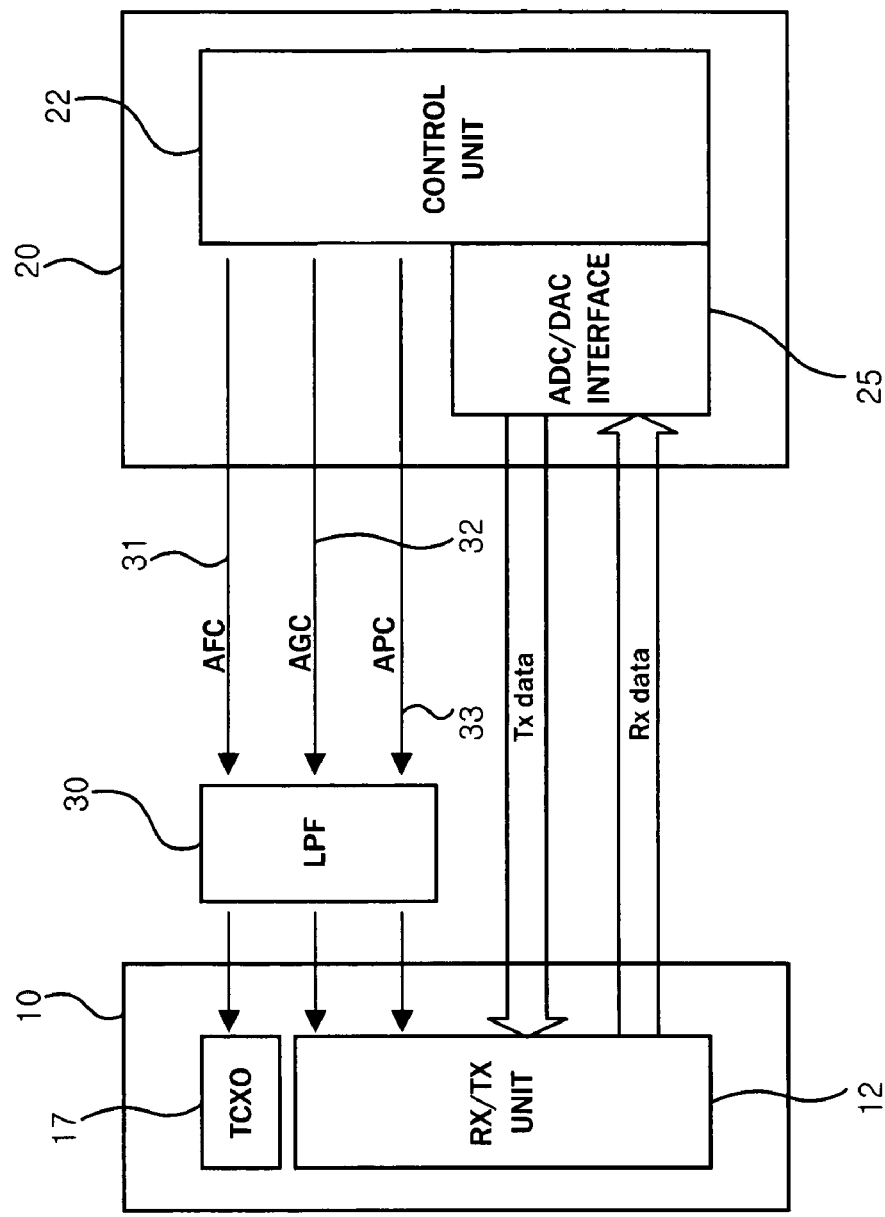
FIG. 2 is a block diagrams illustrating a conventional automatic control apparatus for a TD-SCDMA terminal.
Figure 3:
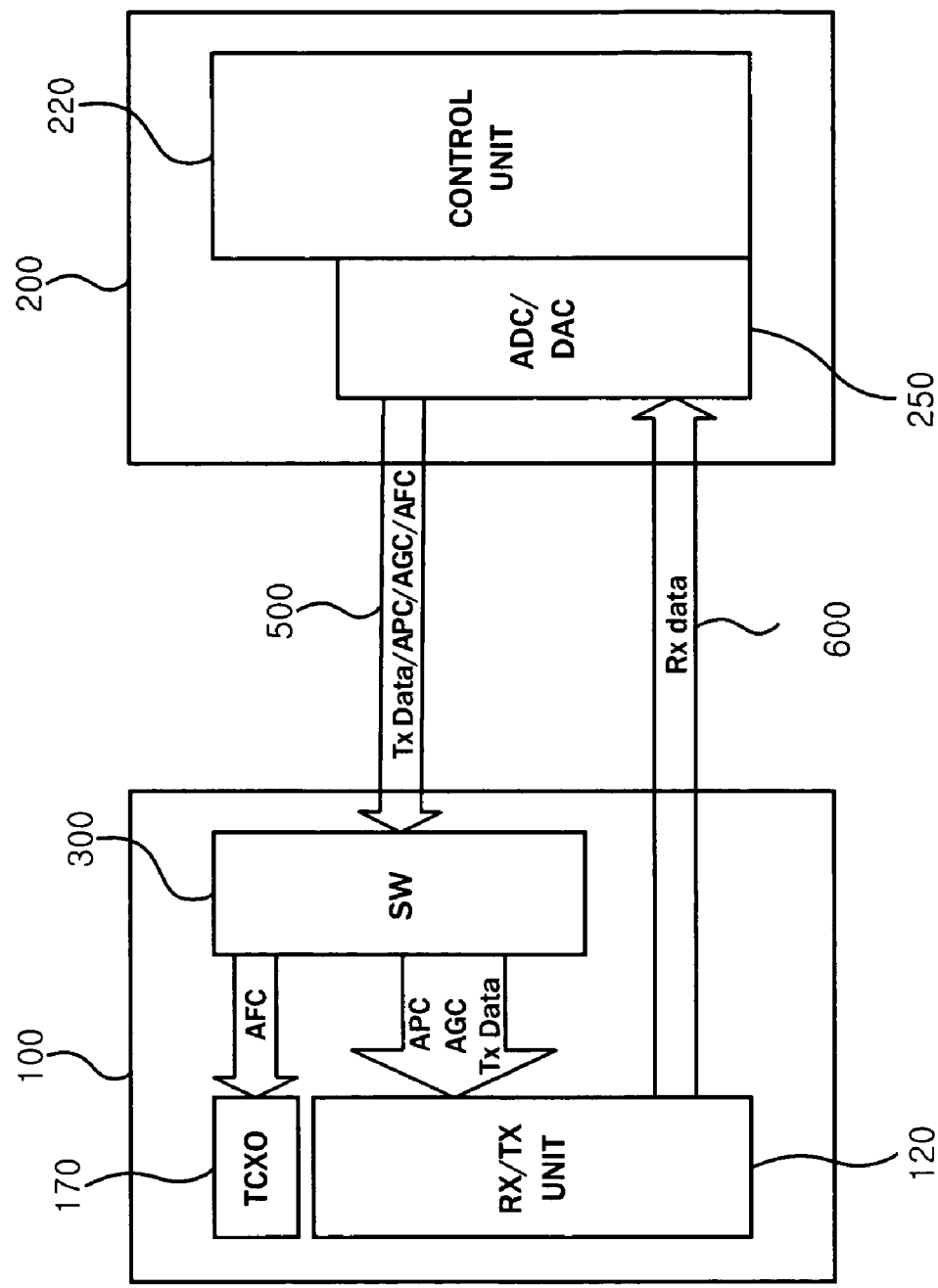
FIG. 3 is a block diagram illustrating an automatic control apparatus for a TD-SCDMA terminal according to a preferred embodiment of the present invention.

FIG. 3 is a block diagram illustrating the automatic control apparatus of the mobile terminal according to one embodiment of the present invention. As shown in FIG. 3, the automatic control apparatus comprises a baseband modem 200 and an RF processing module 100 that are connected to each other through a transmission data line 500 and a reception data line 600.

The baseband modem 200 comprises an analog/digital-digital/analog converter (ADC/DAC) 250 for modulating/demodulating the transmission and reception data, and a control unit for controlling the ADC/DAC converter 250 and generating an automatic control signal.

The RF processing module 100 comprises a transmission/reception (Tx/Rx) unit 120 for processing transmission and reception data, an oscillator (TCXO) 170 for generating oscillating frequency, and a switch 300 for selectively routing the data and automatic control signals from the baseband modem 200 to the TCXO 170 or Rx/Tx unit 120.

In the automatic control apparatus described above, once the mobile terminal enters the transmission mode, the transmission data is converted into an analog signal by the ADC/DAC converter 250 and is transmitted to the RF processing module 100 through the transmission data line 500. When the transmission data is inputted, the switch 300 of the RF processing module 100 transmits the inputted data to the Tx/Rx unit 120, such that the transmission data is processed by the Tx/Rx unit 120 and then transmitted through the antenna.

Conversely, when the mobile terminal enters the reception mode, the signal received through the antenna is processed by the Tx/Rx unit 120 of the RF processing module 100 and then transmitted to the baseband modem 200 through the reception data line 600. While the mobile terminal is in the reception mode, the transmission data line 500 is idle. The automatic control signal generated by the baseband modem 200 is converted into an analog signal by the ADC/DAC converter 250 and then transmitted to the RF processing module 100 through the transmission data line 500, which is in the idle state, under control of the control unit 220. If the automatic control signal is received, the switch 300 of the RF processing module 100 determines whether the automatic control signal is an AFC, APC, or AGC. The switch 300 transfers the AFC to the TCXO 170 and transfers respective APC and AGC to appropriate elements of the Tx/Rx unit 120.

The automatic control signals are transmitted to the RF processing module through the transmit data line (which is in the idle state) and in reception mode of the mobile terminal, such that the levels of the automatic control signals can be determined in advance before the data symbol period of a downlink timeslot ends. An automatic control method for a mobile terminal according to the preferred embodiment of the present invention will be described hereinafter.

Figure 4:
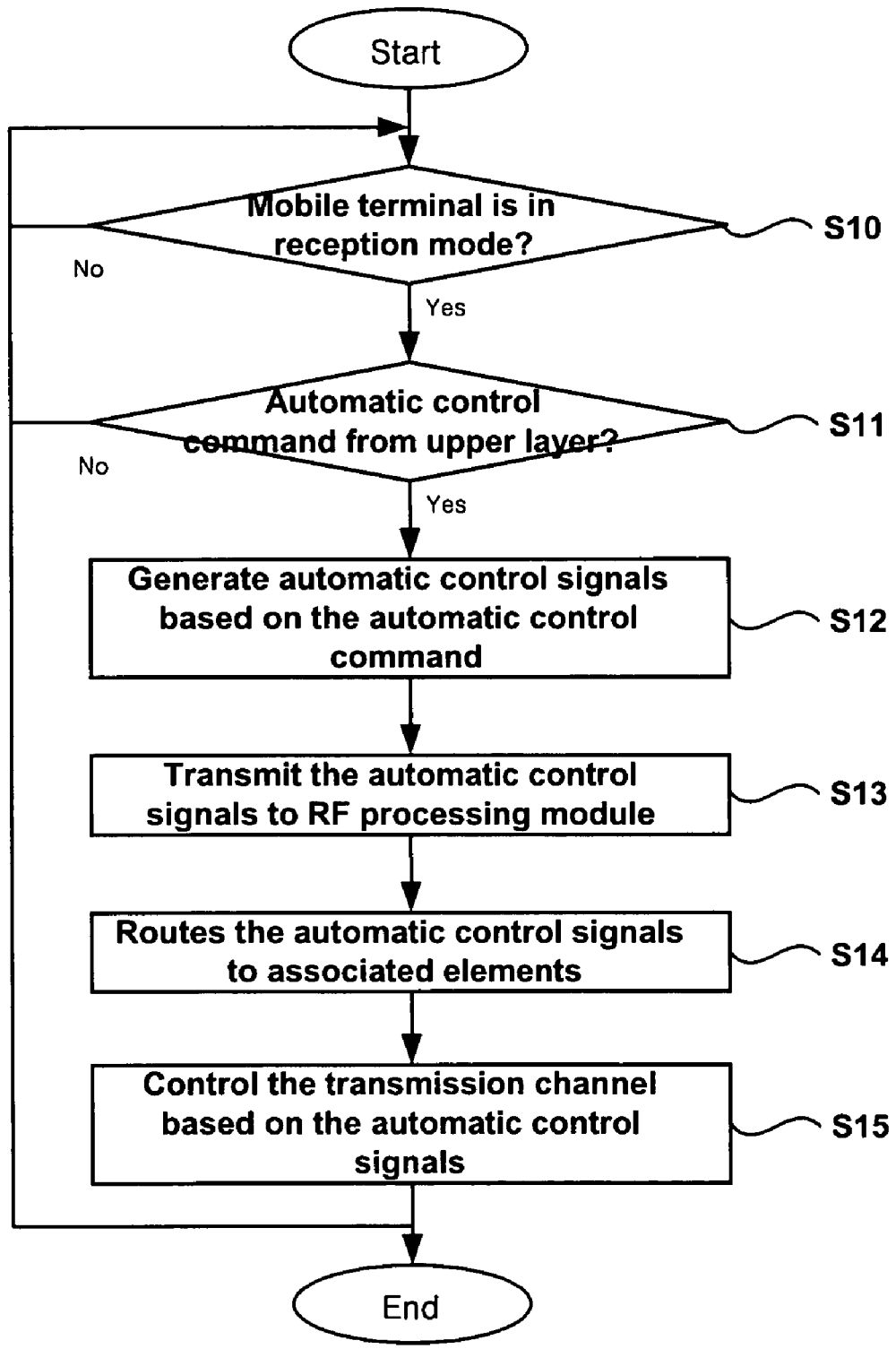
FIG. 4 is a flowchart illustrating an automatic control method for a TD-SCDMA terminal according to the preferred embodiment of the present invention.

FIG. 4 is a flow chart illustrating an exemplary automatic control method for the mobile terminal according to the present invention. As shown in FIG. 4, when the mobile terminal enters the reception mode at step S10, the baseband modem 200 determines whether or not there is an automatic control command from an upper layer application at step S11, and generates an analog automatic control signal if there is the automatic control command from the upper layer application at step S12. Sequentially, the baseband modem 200 transmits the automatic control signal to the RF processing module 100 through the transmission data line 500 at step S13. Once the automatic control signal is received, the switch 300 of the RF processing module 100 determines whether the automatic control signal is the AFC, APC, or AGC signal and transmits the AFC signal to the oscillator 170 and transmits the APC signal and the AGC signal to appropriate elements of the transmission/reception unit 120 according to the kind of the automatic control signal at step S14. Consequently, the RF processing module 100 controls the quality of the transmission channel based on the automatic control signals at step S15.

As described above, in the automatic control apparatus for the mobile terminal according to the exemplary embodiments of the present invention, the automatic control signals are transmitted to the RF processing module through the transmission data line, which is in the idle state, in the reception mode rather than an additional control lines for transmitting the respective automatic control signals such that utilization of the transmit data line between the baseband modem and the RF processing module can be improved.

Also, since the control lines for transmitting the automatic control signals and the filter for converting the PWM signal into the DC signal in the related art automatic control apparatus are removed in automatic control apparatus of the present invention, it is possible to secure space for mounting other devices on the PCB, resulting in compactness of the mobile terminal.

Also, since the automatic control signals are transmitted to the RF processing module through the transmission data line when the mobile terminal is in the reception mode, the levels of the automatic control signals can be determined in advance before the data symbol period of the down link timeslot has ended.

Furthermore, since the switch installed on the RF processing module for routing the automatic control signals to corresponding elements of the RF processing module facilitates implementation relative to the filter including passive devices for converting the PWM signal into the DC signal. This makes it possible to integrate all elements of the RF processing unit in one chip.

The present invention may be embodied in several forms without departing from the spirit or essential characteristics. It should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are therefore intended to be embraced by the appended claims.

What is claimed is:

1. An automatic control system of a mobile terminal for time division duplex (TDD) based communication system, comprising:
   a RF processing module to control quality of a transmission channel; and
   a baseband modem to generate automatic control signals based on control information received from a base station and to transmit the automatic control signals across a transmission data line to the RF processing module while the mobile terminal is in a reception mode, the baseband modem further to transmit transmission data across the transmission data line to the RF processing module while the mobile terminal is in the transmission mode, wherein the RF processing module includes:
      a transmission/reception unit to process the data received through an antenna of the mobile terminal so as to transmit the data to the baseband modem, and the transmission/reception unit to process the transmission data received from the baseband modem across the transmission data line so as to transmit the transmission data in the air through the antenna,
      an oscillator to generate an oscillating frequency, and
      a switch to receive the automatic control signals from the transmission data line and to check a type of the automatic control signals received across the transmission data line from the baseband modem while the mobile terminal is in the reception mode, and the switch to route the automatic control signal to the transmission/reception unit when the received automatic control signal is an automatic power control (APC) signal or an automatic gain control (AGC) signal and the switch to route the automatic control signal to the oscillator when the received automatic control signal is an automatic frequency control (AFC) signal, wherein the APC, AGC, and AFC signals are transmitted to the RF processing module across the transmission data line.

2. The system of claim 1, wherein the automatic control signal is an analog signal.

3. The system of claim 1, wherein the baseband modem comprises:
   a converter that converts digital data to be transmitted into analog data, and that converts received analog data into digital data; and
   a control unit that controls the converter.

4. The system of claim 1, wherein the RF processing module controls quality of the transmission channel based on the automatic control signals received from the baseband modem.

5. The system of claim 4, wherein the baseband modem comprises:
   a converter that converts digital data to be transmitted into analog data and that converts received analog data into digital data; and
   a control unit that controls the converter.

6. An automatic control system of a mobile terminal for time division duplex (TDD) based communication system, comprising:
   an RF processing module that controls quality of a transmission channel; and
   a baseband modem coupled to the RF processing module through a transmission data line and coupled to the RF processing module through a reception data line, the baseband modem to generate automatic control signals based on control information received from a base station and to transmit the automatic control signals to the RF processing module through the transmission data line when the mobile terminal is in a reception mode, the baseband modem further to transmit transmission data through the transmission data line to the RF processing module when the mobile terminal is in a transmission mode, wherein the RF processing module includes:
      a transmission/reception unit to process data received through an antenna of the mobile terminal so as to transmit the data to the baseband modem, and to process the transmission data received from the baseband modem across the transmission data line so as to transmit the transmission data through the antenna,
      an oscillator to generate an oscillating frequency, and
      a switch to receive the automatic control signals from the transmission data line and to check a type of the automatic control signals received across the transmission data line from the baseband modem while the mobile terminal is in the reception mode and the switch to route the automatic control signal to the transmission/reception unit when the received automatic control signal is an automatic power control (APC) signal or an automatic gain control (AGC) signal and the switch to route the automatic control signal to the oscillator when the received automatic control signal is an automatic frequency control AFC signal, wherein the APC, AGC, and AFC signals are transmitted to the RF processing module through the transmission data line.

7. The system of claim 6, wherein the baseband modem comprises:

a converter that converts digital data to be transmitted into analog data and that converts received analog data into digital data; and a control unit that controls the converter.

8. An automatic control method for a time division duplex (TDD) based mobile terminal, comprising:

determining whether the mobile terminal is in a transmission mode or is in a reception mode;

determining whether or not an automatic control command is received from an upper layer when the mobile terminal is in the reception mode;

generating automatic control signals based on the automatic control command if the automatic control command is received from the upper layer;

transmitting the automatic control signals across a transmission data line to an RF processing module when the mobile terminal is in the reception mode, wherein transmitting the automatic control signals across the transmission data line includes:

routing the automatic control signal to associated elements of a transmission/reception unit of the RF processing module when the automatic control signal transmitted across the transmission data line is an APC signal or an AGC signal, and routing the automatic control signal to an oscillator of the RF processing unit when the automatic control signal transmitted across the transmission data line is an AFC signal;

transmitting transmission data across the transmission data line to the RF processing module when the mobile terminal is in the transmission mode; and setting a quality of a transmission channel based on the automatic control signals transmitted across the transmission data line.

9. The method of claim 8, wherein the automatic control signals are transmitted across the transmission data line connecting a baseband modem and the RF processing module.

10. The method of claim 9, wherein the automatic control signals are transmitted to the RF processing module before the mobile terminal enters the reception mode.

11. The method of claim 10, wherein the automatic control signals include an automatic power control (APC) signal, an automatic gain control (AGC) signal, and an automatic frequency control (AFC) signal.

12. The system of claim 1, wherein the baseband modem determines whether the communication system is in the transmission mode or is in the reception mode, the baseband modem determines whether or not a control command is received from an upper layer when the communication system is in the reception mode, and the baseband modem generates the control signals based on the control command when the control command is received from the upper layer.

13. The system of claim 6, wherein the baseband modem determines whether the communication system is in the transmission mode or is in the reception mode, the baseband modem determines whether or not a control command is received from an upper layer when the communication system is in the reception mode, and the baseband modem generates the control signals based on the control command when the control command is received from the upper layer.

* * * * *